June 13, 1939.  F. MANNING  2,161,831
FILTER
Filed Feb. 24, 1937   2 Sheets-Sheet 2
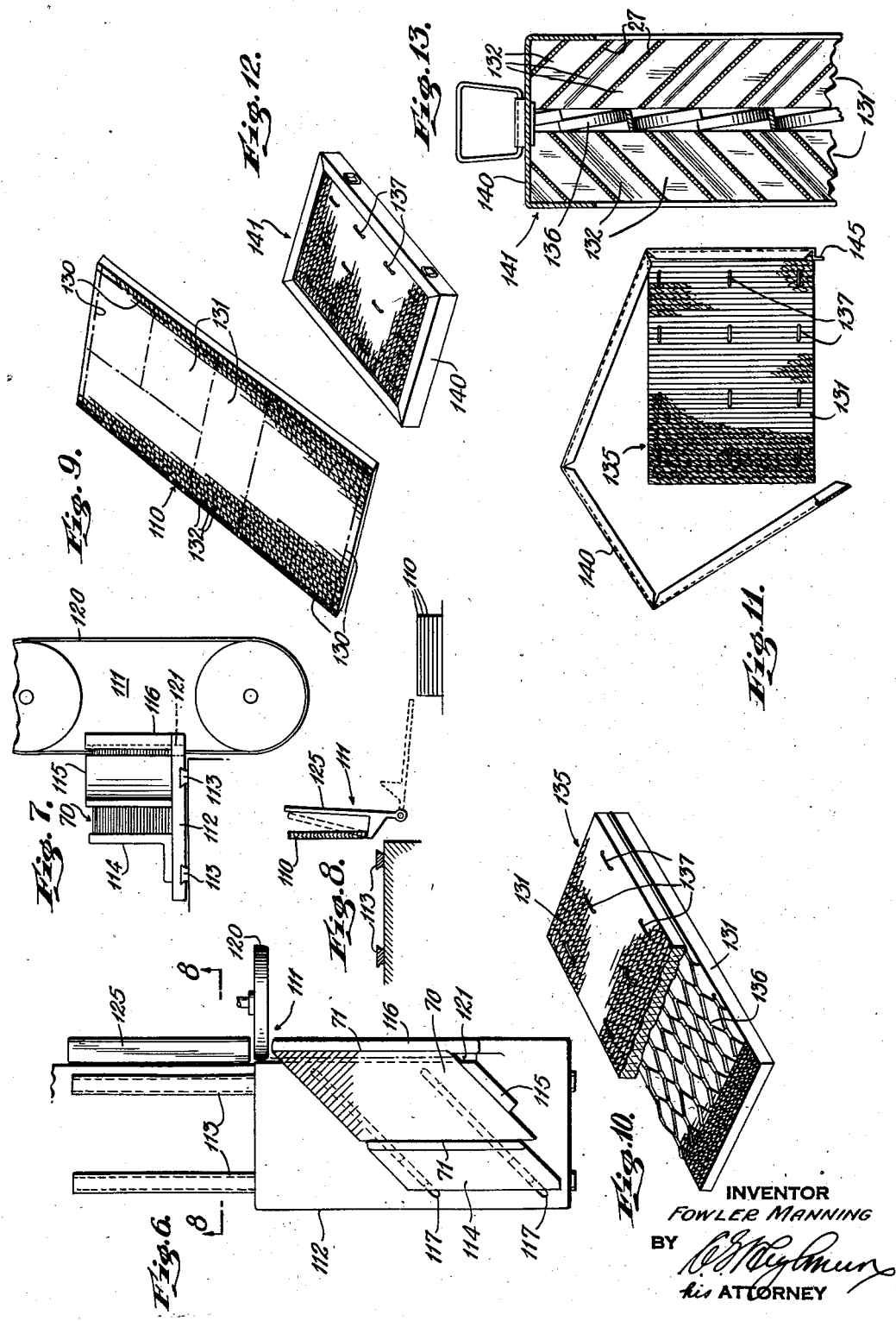
INVENTOR
FOWLER MANNING
BY
his ATTORNEY Patented June 13, 1939

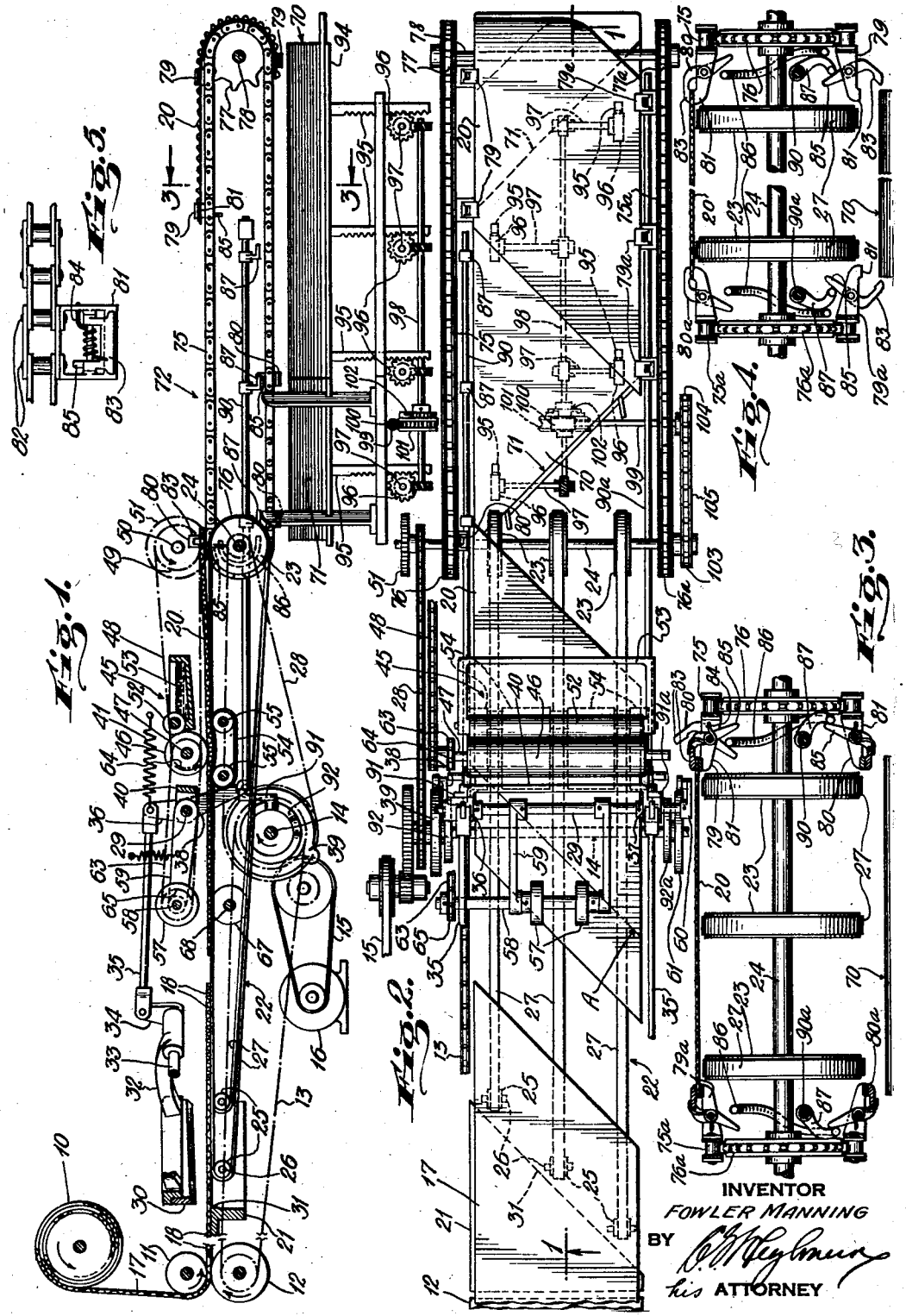

2,161,831

UNITED STATES PATENT OFFICE 2,161,831

FILTER

Fowler Manning, Bronxville, N. Y., assignor, by mesne assignments, to American Radiator & Standard Sanitary Corporation, New York, N. Y., a corporation of Delaware Application February 24, 1937, Serial No. 127,338

4 Claims. (Cl. 154—2)

This invention relates to filters, and more particularly to methods of making filters of the type used to remove solid particles from streams of fluid. One example of this type of filter is one which is used in air conditioning apparatus for the purpose of removing dust, dirt, pollen, or the like from a stream of air flowing therethrough.

An object of my invention is to provide an improved method of making filters, which method is simple and easy to practice, and which produces a uniform product both as to its structural features and as to its quality.

A further object is to provide an improved method of the above type, which lends itself well towards the production of filters in large numbers per unit of time, and consequently towards a comparatively low cost of product.

The invention consists in the series of steps forming the method more fully described hereinafter, the novelty of which will be particularly pointed out and distinctly claimed.

In the accompanying drawings, to be taken as a part of this application, I have illustrated one form of apparatus which may be used to perform the several steps constituting my method in which drawings—

Fig. 1 is a longitudinal vertical section illustrating a portion of one form of apparatus which may be used in carrying out certain steps of my method, the plane of the section being indicated by the line 1—1 of Fig. 2.

Fig. 2 is a plan view showing the apparatus of Fig. 1 with the cutting knife removed for purposes of clarity.

Fig. 3 is a vertical transverse sectional view through the stacking mechanism, the view being taken on the line 3—3 of Fig. 1.

Fig. 4 is a view similar to Fig. 3 and illustrating one of the sections of corrugated sheet material in a different position on the stacking mechanism.

Fig. 5 is a detail fragmentary view showing in plan one of the grippers which transport the sections in the stacking mechanism.

Fig. 6 is a plan view illustrating one form of apparatus for cutting slabs of uniform thickness from the previously stacked composite block.

Fig. 7 is an end elevation of the apparatus shown in Fig. 6.

Fig. 8 is a vertical section on the line 8—8 of Fig. 6 and showing one manner of disposing of the slabs after they have been cut.

Fig. 9 is a perspective view of a slab and indicating by dot and dash lines how the slab may be trimmed and cut to form filter wafers of various desired sizes.

Fig. 10 is a perspective view, partially broken away, illustrating one manner of assembling filter wafers to form a composite air filter unit.

Fig. 11 is an elevational view showing the composite filter of Fig. 10 as it is being assembled in a frame.

Fig. 12 is a perspective view illustrating the completed composite air filter of Figs. 10 and 11.

Fig. 13 is a fragmentary transverse vertical section through the composite filter of Fig. 12 showing more clearly the angle of inclination of the air passages with respect to the opposite side faces of the wafers.

According to one specific embodiment of my invention, the improved method comprises, first, providing a moving sheet of corrugated paper of even width with the corrugations extending normal to the direction of movement of the sheet; second, cutting successively across the moving sheet to provide sections of approximately the same shape and size with the line of the cut extending at an oblique angle (for example, 45°) to the direction of extent of the corrugations; third, applying adhesive to at least one side face of each of the sections; fourth, forming a prism of the sections by stacking the sections one upon the other with the side face of each of the sections carrying the adhesive in the same relative position in the prism as the corresponding face of the other sections and with corresponding oblique edges of the sections in superimposed parallel relation so as to provide the prism with at least one planar face which extends obliquely to the direction of extent of all of the corrugations; and fifth, cutting successively slabs of uniform thickness from said planar face of the prism with the plane of the cuts extending parallel to the plane of the planar face, whereby the corrugations form parallel air passages extending through the slabs and obliquely to the opposite side faces thereof.

In Figs. 1 to 5 inclusive of the drawings, I have illustrated apparatus for performing automatically the first four steps of the method outlined above as comprising one specific embodiment of my invention. It will be appreciated, however, that the invention is not to be considered as limited to this particular type of apparatus, for the method can be performed by other types of apparatus; or, the method can even be performed by hand, if desired.

The first step outlined above as forming a part of one specific embodiment of my invention, comprises providing a moving sheet of corrugated paper of even width, with the corrugations extending normal to the direction of movement of the sheet. This step may be accomplished by providing a roll of corrugated paper, indicated at 10, suitably supported for free rotary movement in the direction indicated by the arrow, and by providing a pair of feed rollers 11 and 12 which may be suitably driven at constant speed by a chain belt 13 from a power shaft 14; the latter being in turn driven by a belt 15 from a suitable electric motor 16. The sheet of paper is indicated at 17 and the corrugations at 18. The sheet 17 is passed between the rollers 11 and 12, and when the latter are operated in the direction indicated by the arrow, the sheet 17 is fed therethrough at a constant rate.

It is to be noted at this point that, insofar as its broader aspects are concerned, my invention is not to be considered as being limited to any particular type of paper. For example, the sheet of corrugated paper 17 may be the conventional type of corrugated paper formed from a suitable vegetable pulp. On the other hand, the paper 17 may be formed from mineral fibers. An example of the latter type of paper is known in the trade as "asbestos paper".

The second step outlined above is that of cutting successively across the moving sheet of corrugated paper 17 to provide sections 20 of approximately the same shape and size and with the line of the cut extending at an oblique angle (for example, 45°) to the direction of extent of the corrugations. In carrying out the second step, the sheet 17 is fed by the action of the rollers 11 and 12 onto a stationary supporting plate 21; and from there the sheet 17 is fed onto a belt conveyor 22, the latter comprising spaced driving pulleys 23 keyed to a driving shaft 24, spaced idler pulleys 25 suitably supported for free rotary movement by idler shafts 26, and belts 27 connecting respectively the pulleys 23 and 25. The driving shaft 24 is driven by a chain belt 28 from the power shaft 14 and at a faster rate of speed than the rollers 11 and 12. As the sheet 17 is being fed by the rollers 11 and 12 at a constant rate of speed, the sheet is cut at evenly spaced time intervals by a knife 30 operated in timed relation to the movement of the sheet by a cam 39 keyed to the power shaft 14. Also, as the belt conveyor 22 is operating at a faster rate than the feed rollers 11 and 12, there will be slippage between the forward end of the sheet 17 and the conveyor 22 prior to a cut by the knife 30; but, immediately after a cut, the newly formed section 20 assumes the speed of the conveyor 22, as will appear more fully hereinafter.

The knife 30 is arranged at the desired oblique angle of cut, which, as stated, may be approximately 45°, and the knife cooperates with the oblique edge 31 of the support 21 in making the cut in a manner well known to those skilled in the art.

The knife 30 is suitably mounted on a rocking frame 32, the latter being supported for rocking movement by a suitable shaft 33. The frame 32 includes spaced upstanding operating arms 34 (only one being shown), which are connected by operating links 35 with spaced arms 36 and 37 journalled for free movement on a supporting shaft 29 extending transversely above the conveyor 22. The arm 36 is rigidly connected with a downwardly extending arm 38 to form in effect a bell crank, and the lower end of the arm 38 is in constant engagement with the surface of a cam 39 keyed to the shaft 14. The arms 36 and 37 are rigidly connected for operation in unison by a cross-bar 40. The arm 38 is held against the surface of the cam 39 by a suitable tension spring 41, suitably anchored at one end and connected at its other end to the arm 36. As the spring 41 holds the arm 38 in engagement with the cam 39, it also serves to hold the knife 30 in its upper position above the sheet 17 at all times, except when the high point of the cam 39 engages the arm 38 and rocks the frame 32 and thereby moves the knife downwardly into cutting position.

The third step of the method as outlined above, is that of applying an adhesive to at least one face of the sections 20. This step is performed by a means indicated at 45, and comprising an adhesive-applying roller 46 which is keyed to a rotatable shaft 47, and the latter is driven by a chain belt 48 from a sprocket 49 keyed to a stub shaft 50, the latter being connected to the driving shaft 24 by spur gearing 51. The driving connection is such that the peripheral surface of the roller 46 is positively driven at the same constant rate of speed as the surface of the belt conveyor 22. The roller 46 is in constant engagement with an idler roller 52 which is partially immersed in a supply of adhesive in a reservoir 53.

The means 45 also comprises idler supporting belts 54 which are supported for movement by spaced idler rollers 55 extending transversely beneath the sections 29. In operation, the sections 20 are arranged between the roller 46 and the supporting belts 54, and the rotation of the roller in the direction indicated by the arrow results in the applying of adhesive to the upper surface of said section, and, at the same time, in positively propelling the section 20 toward the right, as viewed in Figs. 1 and 2, and at the same constant speed as the belt conveyor 22.

As stated previously, the surface of the belt conveyor 22 operates at a faster speed than the peripheral surfaces of the feed rollers 11 and 12, and at the same speed as the peripheral surfaces of the roller 46. Therefore, when the knife 30 is moved down to cut the sheet 17 to form a section 20, the section 20 thus cut is carried away from the knife 30 at a faster rate of speed than the forward end of the sheet 17 is being fed.

In order to assure that the section 20, as it is cut, shall instantaneously move at the speed of the belt conveyor, and also in order to positively time the movement of the section 20 with respect to the movement of the belt 22, I have provided a pair of positively-driven feed rollers 57 which are moved down into engagement with the section 20 immediately after the latter is cut from the sheet 17. The feed rollers 57 are keyed to a shaft 58 and the latter is rotatably mounted in a rocking frame 59. The frame 59 is keyed at its other side to the shaft 29, and the latter is rocked by means of an arm 60 also keyed to the shaft 29 and engaging at its lower end a cam 61 keyed to the power shaft 14. The cams 61 and 39 are so arranged on the shaft 14 that the knife 30 is moved into cutting engagement with the sheet 17, and immediately thereafter the feed rollers 57 are moved downwardly and into engagement with the section 20 that has just been cut.

The feed rollers 57 are positively rotated at the same speed as the belt 22 by a chain belt 63 connecting a sprocket 64 on the roller shaft 47 and a sprocket 65 on the shaft 58 supporting the feed rollers 57. In order to assure the positive gripping of the sections 20 by the rollers 57 when they are lowered by the cam 61, a pair of idler rollers 67 are respectively arranged beneath the feed rollers 57 and the sheet 20 is engaged therebetween, the idler rollers being supported for free rotation by a suitable idler shaft 68.

From an examination of Fig. 2 the dot-and-dash line indicated by the reference character A is the position occupied by the oblique forward edge of the sheet 17 at the moment the knife cuts the sheet to form a section 20. It will be observed that when the sheet 17 is in position to be cut, the extreme forward end thereof is just short of the space between the positively-driven adhesive-applying roller 46 and the belts 54. Therefore, as the section 20 is cut and the gripping rollers 57 come into engagement with the section, the forward end of the section is immediately fed between the positively-driven adhesive-applying roller 46 and the belt 54, and the sheet is from there fed positively by the roller 46 and belt 22. The rollers 57 only engage the sections 20 momentarily to secure proper timing between the position of the sections 20 with respect to the belt conveyor 22 and the roller 46.

The fourth step in the method as indicated above, is that of forming a prism 70 by stacking the sections 20 one upon the other, with the faces of the sections carrying the adhesive arranged in the same relative position in the prism, and with corresponding cut edges of sections 20 overlying one another to provide the prism with inclined faces 71 which are arranged at oblique angles (for example, 45°) to the direction of extent of the corrugations. The mechanism for stacking the sections 20 is indicated in general by the reference character 72 and comprises a pair of parallel endless conveyor chains 75 and 75a, spaced apart a distance sufficient to permit the sections 20 to be held between the chains as they are moved along thereby. The chains 75 and 75a, at the left-hand end, as viewed in Figs. 1 and 2, pass around spaced driving sprockets 76 and 76a, respectively, which are keyed to the driving shaft 24; and, at their right-hand end, the chains pass around spaced idler sprockets 77 and 77a, respectively, the latter being supported for free rotary movement upon an idler shaft 78.

The chain 75 is provided with two sets of releasable grippers 79 and 80, respectively, and the chain 75a is likewise provided with two sets of releasable grippers 79a and 80a, respectively. I have shown in the drawings each of the sets of grippers 79, 80, 79a, and 80a, as comprising three equally spaced grippers which extend inwardly from their respective chains. In operation, the grippers of the set 79 are adapted to engage at equally spaced points one longitudinal edge of a section 20, and the grippers of the set 79a engage at equally spaced points the opposite longitudinal edge of the same section 20. Likewise, the grippers of the sets 80 and 80a are adapted to engage opposite longitudinal edges of another section 20. As the sections 20 are rhomboidal in shape, due to the angle of cut by the knife 16, the grippers of the sets 79 and 80 are arranged in opposed staggered relation with respect to the grippers of the sets 79a and 80a, respectively.

Each of the grippers comprises a stationary jaw 81 fixed to the ends of pins 82 forming a part of the chains 75 and 75a, and a pivoted jaw 83 constantly urged by a coil spring 84 into engagement with the stationary jaw 81 (see Fig. 5). The pivoted jaw 83 is provided with an operating arm 85 which is adapted to be periodically engaged by a stationary cam member 86 and by a releasing arm 87. The jaw 83 is opened by a cam 86 so that it can grip a section 20 at the proper time, and the jaw 83 is opened by an arm 87 so that a section 20 will be released and stacked at the proper time.

From an examination of Figs. 1 and 3, it will be readily seen that I have provided two cam members 86 which are respectively arranged adjacent the sprockets 76 and 76a, and are in the form of curved bars partially encircling the shaft 24. The cam members 86 are suitably supported in fixed relation with respect to the moving sprockets, chains and grippers, and are so arranged with respect to the chains and grippers that as a gripper passes around its respective driving sprocket (76 or 76a), its movable operating arm 85 is engaged by the adjacent cam 86 and is thereby moved inwardly from its respective chain. As a result, the movable gripping jaw 83 is moved away from its stationary jaw 81. Each of the cam members 86 terminates just beyond the vertical plane passing through the axis of the driving shaft 24; so, at this point, each cam member 86 releases the operating members 85 and the respective springs 84 move the movable jaws 83 downward toward their stationary jaws, which results in each of the grippers engaging firmly the longitudinal edge of a section 20 at this point in its movement.

In Figs. 1, 2 and 3 of the drawings, the movable jaw 83 of the leading gripper of set 80 is shown as being open and just before the gripper passes beyond the cam 86, and the leading edge of a section 20 is shown as resting on the stationary jaw. When the leading gripper 80 passes beyond the cam, the movable jaw 83 thereof will immediately close and firmly hold the forward or leading edge of this section 20.

As the pulleys 23 of the belt conveyor 22, and the sprockets 76 and 76a of the chains 75 and 75a, respectively, are all keyed to the same driving shaft 24, and as the rollers 57 and 46 are also driven positively from the shaft 24, the movement of the sections 20 on the conveyor belt 22 and the movement of the grippers on the chains 75 and 75a are so coordinated that the grippers of each set will engage a longitudinal edge of a section 20 at the same point each time they move around the driving sprockets 76 and 76a into gripping position.

There are two sets of releasing arms 87, and there are three arms to each set, and the arms of each set are spaced apart the same distances as the grippers forming each of the sets 79, 80, 79a and 80a. The two sets of arms 87 are arranged respectively adjacent the chains 75 and 75a, and are so positioned that the grippers which engage the opposite longitudinal edges of a given section 20 are released simultaneously and at the same point during their travel along the lower runs of the chains. The arms 87 constituting the set adjacent the chain 75 are fixed to a shaft 90 which is suitably mounted for oscillatory movement and extends to the left, as viewed in Figs. 1 and 2, to points adjacent the power shaft 14. Likewise, the arms 87 constituting the set adjacent the chain 75a are suitably keyed to a shaft 90a which is also mounted for oscillatory movement and extends toward the left and to points adjacent the driving shaft 14. The left-hand ends of shafts 90 and 90a are provided, respectively, with operating arms 91 and 91a, and the latter are so arranged that they engage, respectively, cams 92 and 92a fixed in spaced relation and on the driving shaft 14. Thus, as the cams 92 and 92a rotate, the arms 91 and 91a and the shafts 90 and 90a are periodically moved so that the arms 87 of the two sets move inwardly from the chains and engage the operating arms 85 of the movable jaws 83 to release a section 20.

As stated, the arms 87 constituting one set are so spaced that they will each engage simultaneously the operating arms 85 of one of the sets of grippers when such set reaches a predetermined point in its travel along the lower run of its respective chain. The driving connection existing between the chains 75 and 75a, power shaft 14, drive shaft 24, and cams 92 and 92a, make this timing possible.

Figs. 1, 2 and 3 of the drawings show the position of the parts when one section 20 is passing around the shaft 78 and another section 20 is just moving over the left-hand end of the mechanism 72. In Fig. 4 of the drawings, the position of the parts is such that this section 20 has moved around the shaft 78 and has just been released by the action of the arms 87.

As the operation continues and succeeding sections 20 are released by the arms 87 at the same point as they are carried along the lower runs of the chains, the sections are neatly stacked to form the prism 70. Likewise, the corresponding cut edges of succeeding sections 20 and the corresponding faces of the sections 20 to which adhesive has been applied, will occupy the same relative positions in the prism 70. As a result, the planar faces 71 will be formed, which extend at an oblique angle (for example, 45°) to the direction of extent of the corrugations 18, and the sections 20 will be firmly secured together to form a strong composite unit.

The sections 20 are supported as they are being stacked by a platform 94, and the latter is in turn supported by rack bars 95 engaging pinions 96 carried, respectively, by shafts 97. The shafts 97 are all operatively connected to a shaft 98, which in turn may be suitably driven from a power shaft 99, by a worm 100 and worm wheel 101. The worm wheel 101 is operatively connected to the shaft 98 by a manually-releasable pawl and ratchet mechanism 102. The shaft 99 may be suitably driven from the driving shaft 24 by means of sprockets 103 and 104, secured respectively to the shafts 24 and 99, and a chain belt 105 connecting the sprockets 103 and 104. Thus, as the sections 20 are stacked one upon the other, the platform 94 is continually lowered by the rack and pinion gearing, and when the prism 70 is built up to a desired height, the operation of the apparatus may be stopped and the prism removed. The platform may then be quickly raised to the proper position to support the sections 20 as they are stacked to form a succeeding prism, by first releasing the pawl of the pawl and ratchet mechanism 102, and then grasping and raising the platform 94 by hand, and then resetting the pawl.

When a prism 70 is removed from the platform 94, it is set aside until the adhesive has thoroughly dried and thereby bound the adjacent faces of the sections 20 firmly together so that the prism becomes a strong unitary structure.

The fifth step outlined above as being part of one preferred embodiment of my invention, is that of cutting successive slabs 110 of uniform thickness from one of the diagonal faces 71 of the prism 70, with the plane of the cut extending parallel to the plane of such face 71. In Figs. 6, 7 and 8 of the drawings, there is shown apparatus 111 for performing this next step. The apparatus 111 comprises a movable platform 112 which is mounted for straight sliding movement on stationary guides 113 and which is provided with guide blocks 114, 115 and 116 arranged to engage three sides of the prism 70 and hold it firmly on the platform. The guide blocks 115 and 116 are rigid with the platform 112. The guide block 114 is mounted for sliding movement in guiding grooves 117 formed in the platform 112 and extending at an oblique angle to the direction of movement of the platform, which is the same as the angle of cut and the angle of the faces 71 with respect to the other sides of the prism and the direction of extent of the corrugations.

The apparatus 111 also comprises a band saw 120, which, when a prism 70 is mounted on the platform 112 in the manner just described, and the platform is moved along the guides 113 in a direction towards the saw, cuts a slab 110 of uniform thickness from a diagonal face 71 of the prism 70. The platform 112 is provided with a slot 121 which receives the saw 120 as the slab 110 is being cut.

The apparatus 111 also comprises a supporting and dumping member 125 which is arranged beyond the saw 120 and is mounted for pivotal movement about a stationary axis extending in the same direction as the direction of movement of the platform 112. The member 125 receives the slab 110 as it is being cut; and, when the cut is finished, the member 125 may be moved about its axis to dump the slab 110 so that it will be out of the way during the cutting of the next slab (see Fig. 8).

After a slab 110 is cut by the saw 120 and dumped by the member 125, the platform is then moved back to the position shown in Fig. 6 and the block 114 moved along the guides 117 so the remaining portion of the prism will be held firmly between the guide blocks 114, 115 and 116 during the succeeding cut. After the prism has been cut into slabs in the manner just described, the guide block 114 may be moved back to receive another prism 20, as will be readily understood.

The slab 110 thus formed is shown in perspective in Fig. 9. The dot and dash lines 130 indicate the manner in which the edges of the slab 110 may first be trimmed and the slab then cut to form filter wafers 131 of various predetermined sizes. It will be appreciated that, as the plane of the cut from the prism 20 is at 45° to the direction of extent of the corrugations, each slab 110 and filter wafer 131 is provided with passages 132 formed by the corrugations 27, and the passages 132 extend at an angle of 45° to the opposite faces of the slab and wafer.

In Figs. 10, 11, 12 and 13 of the drawings, I have shown one manner in which a particular type of composite filter unit 135 may be made from two filter wafers 131 formed in the manner previously described. In Fig. 10, two wafers 131 of the same size and shape are selected, and there is interposed between the wafers a spacing and stiffening means, which is here shown to be in the form of a sheet of expanded metal 136. The wafers 131 and the spacing and stiffening means 136 may then be suitably secured together by a plurality of staples, indicated at 137, to form a composite unit.

In Fig. 11 of the drawings, the unit 135 is shown as being assembled within a metallic frame 140 to form a completed filter unit 141 (see Figs. 12 and 13). The frame 140 is channel-shaped in cross-section, and receives the peripheral edges of the composite filter unit 135 formed as in Fig. 10. The free ends of the frame 140, when brought around the filter, are secured together by a suitable tongue 145 carried by one end of the frame 140 and fitting within a slot (not shown), in the other end of the frame. Fig. 12 is a perspective view of the completed composite filter unit formed as indicated in Figs. 10 and 11. In Fig. 13 of the drawings, I have shown a transverse section through the complete composite filter of Fig. 12, which shows clearly the diagonal air passages 132 through each of the wafers 131, formed by the corrugations 27 extending at 45° to the faces of the wafers 131.

When a filter thus formed is placed across an air passage, solid particles carried in the air flowing through the passages 132 will be extracted, due to the change in direction of flow of the air as it flows from one passage 132 in one of the wafers 131 into the opposed passage 132 of the other wafer 131. In order to promote the separation of solid particles from the air stream, the filter wafers 131 may be immersed in a suitable heavy sticky fluid; for example, a heavy oil. This may be done either before or after the composite filter unit is formed. The oil will provide sticky surfaces to the sides of the passages, and will thereby aid in separating the particles out of the streams of air flowing through the passages.

It is to be noted that, insofar as the broader aspects of my invention are concerned, the slab 110 need not be of such a size that a plurality of filter wafers may be formed therefrom; and also, the filter wafers need not be assembled together in the manner described to form a completed filter unit such as is indicated at 141. If desired, the slabs 111 may be used in their entirety as a filter wafer, and they may be installed directly in air circulating or conditioning apparatus where they will perform the function of extracting solid particles from a stream of air flowing therethrough. The particular composite filter unit 141 herein shown, is described and claimed in my copending Letters Patent No. 2,079,297, patented May 4, 1937; and this unit forms no part of the present invention, insofar as its structure is concerned.

It is also to be noted that the particular apparatus described and shown herein for performing the several steps constituting my improved method, are in no way essential to the successful carrying-out of my method. They are included herein as illustrative of one preferred manner in which the method steps may be performed. As stated previously, other apparatus may just as well be used; or, if desired, the steps may be performed for the most part by hand.

From the above, it will be readily apparent that I have provided a method of making filters which is simple and easy to perform, which produces a uniform product both as to its structural features and as to its quality, and which is capable of producing filters in large numbers per unit of time and thereby producing filters which are comparatively inexpensive.

What I claim and desire to secure by Letters Patent of the United States is:—

1. In a method of making air filters, the steps which comprise providing a plurality of approximately similar sections of corrugated paper and each section having one edge extending obliquely to the direction of extent of the corrugations; applying adhesive to at least one side face of each of said sections; stacking the sections one upon the other to form a composite block with the sides carrying the adhesive arranged in similar relative positions in the block and with said one edge of adjacent sections superimposed and parallel to one another so that the block is provided with an approximately planar face formed by said edges of adjacent sections with said face lying in a plane oblique to the direction of extent of all of the corrugations; and cutting successive slabs of uniform thickness from said planar face with the direction of cut parallel to the plane of said planar face so as to provide passages through each of the slabs which are parallel to one another and which extend obliquely to the planes of the opposite faces of each slab.

2. In a method of making air filters, the steps which comprise providing a sheet of corrugated paper of approximately even width and having all of its corrugations extending in parallel lines; cutting across the corrugated sheet to form sections of approximately the same shape and size, with the direction of cut extending obliquely to the direction of extent of the corrugations; applying an adhesive to at least one side of each of the sections; forming a prism of the sections by stacking the sections one on top of the other with the sides carrying the adhesive arranged in the same relative position in the prism, and with the edges of each section formed by the cutting step arranged in superimposed parallel relation to the corresponding edges of the previously stacked sections so as to provide at least one face of the prism which is oblique to the direction of extent of the corrugations; and cutting successive slabs of uniform thickness from said one face of the prism with the plane of the cut parallel to said one face so as to provide passages through each of the slabs which are parallel to one another and are oblique to the planes of the opposed faces of each slab.

3. In a method of making air filters, the steps which comprise providing a continuously moving sheet of corrugated paper of approximately even width and having all of its corrugations extending in parallel lines; cutting successively across the corrugated sheet of paper to provide sections of approximately the same shape and size, with the direction of cut extending obliquely to the direction of extent of the corrugations; applying an adhesive to at least one side face of each of the sections; forming a prism by stacking the sections one on top of the other with the sides of the sections having the adhesive arranged in the same relative position in the prism, and with those edges of adjacent sections which are formed by the cutting step overlying one another to provide at least one face of the prism which extends obliquely to the direction of extent of the corrugations; and cutting successive slices of uniform thickness from said one face of the prism with the plane of the cut extending parallel to said one face so as to provide passages through each of the slices which are parallel to one another and oblique to the opposed faces of each slice.

4. In a method of making air filters, the steps which comprise providing a continuously moving sheet of corrugated paper of approximately even width and with all of its corrugations extending parallel to one another and normal to the direction of movement of the sheet; cutting successively across the corrugated sheet to form sections of approximately the same shape and size, with the direction of cut extending diagonally with respect to the direction of movement of the sheet and to the direction of extent of the corrugations; applying an adhesive to at least one side face of each of said sections; stacking the sections one on top of the other with the corresponding diagonal edges of successive sheets in juxtaposed relation and with the sides of the sheets carrying the adhesive similarly arranged with respect to one another so as to provide a prism having top and bottom faces shaped as rhomboids, and having two opposed side faces formed by the superimposed diagonal edges of the severed sections; and cutting successive slabs of uniform thickness from one of the faces of the prism formed by the diagonal edges with the plane of the cut extending parallel to said one face, so as to provide filter wafers having parallel passages therethrough extending diagonally to the plane of the cut.

FOWLER MANNING.